United States Patent
Ko et al.

(10) Patent No.: US 9,735,824 B2
(45) Date of Patent: Aug. 15, 2017

(54) PROTECTION COVER

(71) Applicant: Samsung Electronics Co., Ltd., Gyeonggi-do (KR)

(72) Inventors: A-Reum Ko, Seoul (KR); Hyun-Chul Kim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/878,506

(22) Filed: Oct. 8, 2015

(65) Prior Publication Data

US 2016/0105204 A1    Apr. 14, 2016

(30) Foreign Application Priority Data

Oct. 8, 2014 (KR) .................. 10-2014-0136087

(51) Int. Cl.
*H04B 1/3877* (2015.01)
*H04B 1/3888* (2015.01)
*G06F 1/16* (2006.01)

(52) U.S. Cl.
CPC ......... *H04B 1/3877* (2013.01); *G06F 1/1628* (2013.01); *G06F 1/1632* (2013.01); *H04B 1/3888* (2013.01)

(58) Field of Classification Search
CPC ... H04B 1/3877; H04B 1/3888; G06F 1/1628; G06F 1/1632
See application file for complete search history.

(56) References Cited

U.S. PATENT DOCUMENTS

| | | | | |
|---|---|---|---|---|
| 5,949,643 | A * | 9/1999 | Batio | G06F 1/1616 345/168 |
| 8,607,976 | B2 * | 12/2013 | Wu | G06F 1/1626 206/320 |
| 8,960,421 | B1 * | 2/2015 | Diebel | G06F 1/1628 206/320 |
| D732,541 | S * | 6/2015 | Bates | D14/440 |
| D734,340 | S * | 7/2015 | Kim | D14/440 |
| 9,189,017 | B2 * | 11/2015 | Meyers | B32B 37/14 |
| 2003/0100338 | A1 | 5/2003 | Lee | |
| 2007/0211415 | A1 * | 9/2007 | Seo | G06F 1/1628 361/807 |
| 2008/0316176 | A1 * | 12/2008 | Deutsch | G06F 1/1616 345/168 |
| 2010/0181450 | A1 | 7/2010 | Hulick et al. | |
| 2011/0284420 | A1 | 11/2011 | Sajid | |
| 2012/0088557 | A1 * | 4/2012 | Liang | G06F 1/1628 455/575.1 |
| 2012/0194448 | A1 * | 8/2012 | Rothkopf | A45C 13/002 345/173 |

(Continued)

FOREIGN PATENT DOCUMENTS

WO    WO 2012160327 A1 *  11/2012  ........... G06F 1/1626

OTHER PUBLICATIONS

European Search Report dated Dec. 1, 2015 issued in counterpart application No. 15188997.9-1959, 9 pages.

*Primary Examiner* — Gennadiy Tsvey
(74) *Attorney, Agent, or Firm* — The Farrell Law Firm, P.C.

(57) ABSTRACT

A protection cover is provided, which includes a first cover that is foldable, a first electronic device being attachable to or detachable from the first cover; a second cover that is connected to the first cover so as to be foldable, a second electronic device being attachable to or detachable from the second cover; and a third cover that is connected to the first cover so as to be foldable.

17 Claims, 9 Drawing Sheets

(56) References Cited

U.S. PATENT DOCUMENTS

| | | | |
|---|---|---|---|
| 2012/0211377 A1* | 8/2012 | Sajid | G06F 1/1628 206/216 |
| 2013/0016467 A1* | 1/2013 | Ku | F16M 11/10 361/679.08 |
| 2013/0083465 A1 | 4/2013 | Motoishi et al. | |
| 2013/0088431 A1* | 4/2013 | Ballagas | G06F 1/1626 345/168 |
| 2013/0270980 A1* | 10/2013 | Hsu | H05K 5/03 312/223.1 |
| 2013/0293430 A1* | 11/2013 | Henty | H01F 38/14 343/720 |
| 2014/0029177 A1* | 1/2014 | Ohtaka | H05K 7/00 361/679.01 |
| 2014/0036438 A1* | 2/2014 | Gioscia | G06F 1/1628 361/679.55 |
| 2014/0071607 A1* | 3/2014 | Frinak | G06F 1/1624 361/679.09 |
| 2014/0071654 A1* | 3/2014 | Chien | H01H 13/704 362/23.03 |
| 2014/0083883 A1 | 3/2014 | Elias | |
| 2014/0211393 A1* | 7/2014 | Lee | G06F 1/1626 361/679.12 |
| 2014/0262933 A1* | 9/2014 | Lockwood | A45C 11/00 206/762 |
| 2015/0041341 A1* | 2/2015 | Marshall | A45C 11/00 206/45.2 |
| 2015/0122850 A1* | 5/2015 | Quehl | A45C 11/00 224/191 |
| 2015/0236744 A1* | 8/2015 | Su | H04B 1/3888 455/575.8 |
| 2015/0280768 A1* | 10/2015 | Huang | H04B 1/3888 455/575.8 |
| 2015/0296068 A1* | 10/2015 | Chin | G06F 1/1628 455/575.8 |
| 2015/0381784 A1* | 12/2015 | Wun | H04M 1/04 455/575.1 |
| 2016/0018854 A1* | 1/2016 | Yu | G06F 1/1669 361/679.08 |
| 2016/0197634 A1* | 7/2016 | Lockwood | G06F 1/1632 455/575.8 |

* cited by examiner

PROTECTION COVER

PRIORITY

This application claims priority under 35 U.S.C. §119(a) to Korean Patent Application Serial No. 10-2014-0136087, which was filed in the Korean Intellectual Property Office on Oct. 8, 2014, the entire content of which is incorporated herein by reference.

BACKGROUND

1. Field of the Invention

The present invention relates generally to a protection cover, and more particularly, to a protection cover for protecting an electronic device.

2. Description of the Related Art

In recent years, various electronic devices, such as a cellular phone, a moving picture experts group (MPEG)-1 audio layer-3 (MP3) player, a portable multimedia player (PMP), a tablet personal computer (PC), a Galaxy Tab, an iPad, an electronic book terminal, etc., have been provided to users, to allow access to various types of content while carrying such various electronic devices.

With the rapid development of information and communication technologies, electronic devices have a variety of functions, such as a music and video playback function, a game function, a camera function, a scheduling function, a dictionary function, and the like, in addition to their original functions, in order to meet users' diverse requirements. In addition, electronic devices provide functions for searching for various types of information and adding new applications as well.

For example, the electronic devices are utilized in various tasks, including word processing, social media networking, and games, which are now executed by touching a screen. However, a need for keyboards arises due to a limitation in writing a document using a touch on a screen.

In addition, when users utilize the electronic devices while carrying them in their hands or placing them in their pockets or bags, loss of and damage to the electronic devices due to placing or carrying may occur. Accordingly, for protection, the electronic devices are mounted on separate protection covers.

However, protection covers in the prior art have a structure in which only electronic devices are mounted thereon, but separate keyboards or other devices are not mounted. Some protection covers in the prior art are used as stand cradles and typing cradles while being attached to electronic devices. When the protection covers are used as typing cradles, users have to enter inputs by directly touching screens of the electronic devices, which makes it difficult for the users to enter touch inputs. For example, the users have to touch the screens of the electronic devices several times when writing documents by touching the screens of the electronic devices. That is, there are limitations in touch inputs for tasks more easily performed via a keyboard, such as word processing.

Thus, when users utilize electronic devices for various tasks, such as word processing, social media networking, and games, since such tasks are carried out by touching screens of the electronic devices, there are limitations in using the touch inputs, and thus a need for keyboards arises.

Therefore, a device is required for mounting an electronic device including a large screen and a keyboard together on a protection cover and simultaneously attaching/detaching the electronic device and the keyboard to/from the protection cover.

SUMMARY

The present invention has been made to address at least the above-mentioned problems and/or disadvantages and to provide at least the advantages described below.

Accordingly, an aspect of the present invention is to provide a protection cover that allows an electronic device and a keyboard to be used together through attachment/detachment of them to/from the protection cover.

Another aspect of the present invention is to provide a protection cover in which a plurality of covers, which an electronic device and a keyboard are attached to or detached from together and which are used as a cradle through folding thereof, are configured, thereby enhancing and expanding usability of the products through the keyboard and enhancing portability and convenience of the electronic device and the keyboard.

Another aspect of the present invention is to provide a protection cover in which one or more attachment/detachment units are configured to lock/unlock an electronic device and a keyboard to/from the protection cover for attachment/detachment thereof, thereby facilitating the attachment/detachment of the electronic device and the keyboard to/from the protection cover.

According to an aspect of the present invention, a protection cover is provided, which includes a first cover that is foldable, a first electronic device being attachable to or detachable from the first cover; a second cover that is connected to the first cover so as to be foldable, a second electronic device being attachable to or detachable from the second cover; and a third cover that is connected to the first cover so as to be foldable.

According to another aspect of the present invention, a protection cover is provided, which includes a first cover that is foldable, wherein a first electronic device is attachable to or detachable from a front surface of the first cover, a second cover that is connected to the first cover so as to be foldable, wherein a second electronic device is attachable to or detachable from a front surface of the second cover, and a third cover that is connected to the first cover so as to be foldable, wherein the first, second, and third covers to form a cradle through folding thereof, and the first and second covers each include at least one attachment/detachment unit for attaching or detaching the first and second electronic devices.

BRIEF DESCRIPTION OF THE DRAWINGS

The above and other aspects, features, and advantages of the present invention will be more apparent from the following detailed description, taken in conjunction with the accompanying drawings, in which.

DETAILED DESCRIPTION OF EMBODIMENTS OF THE PRESENT INVENTION

Figure 1:
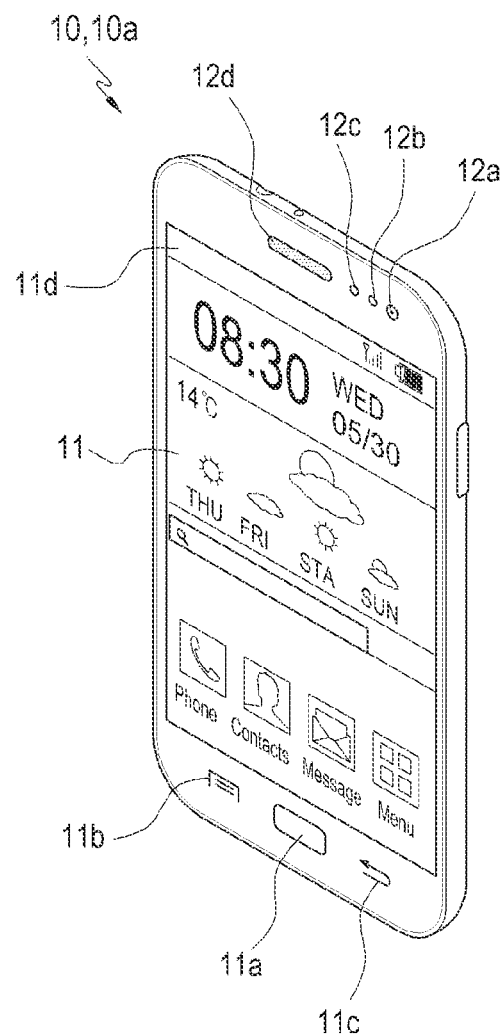
FIG. 1 is a perspective view illustrating a front surface of a first electronic device that can be attached to and detached from a protection cover, according to an embodiment of the present invention.

With respect to the terms used in various embodiments of the present invention, the general terms which are currently and widely used are selected in consideration of functions of structural elements in the various embodiments of the present invention. However, meanings of the terms may be arbitrarily selected to be used. In such a case, the meaning of the term will be described in detail at the corresponding part in the description of the present disclosure. Thus, the terms used in describing various embodiments of the present invention should be defined based on the meanings of the terms and the overall contents of the embodiments of the present invention.

Although the terms including an ordinal number such as first, second, etc. can be used for describing various elements, the structural elements are not restricted by the terms. The terms are used merely for the purpose to distinguish an element from the other elements. For example, a first element could be referred to as a second element, and similarly, a second element could be also referred to as a first element without departing from the scope of the present invention.

Herein, a description will be given of an electronic device according to various embodiments of the present invention, which includes a connection part for electronically connecting to an external connection jack. First, the electronic device according to various embodiments of the present invention may be applied to not only all types of mobile communication terminals that are operated based on communication protocols corresponding to various communication systems, but also all types of information and communication devices, multimedia devices, and application devices thereof, including a video phone, an electronic book (e-book) reader, a laptop PC, a netbook computer, a personal digital assistant (PDA), a portable multimedia player (PMP), an MP3 player, a mobile medical appliance, a camera, or a wearable device (e.g., a head-mounted-device (HMD) such as electronic glasses, electronic clothes, an electronic bracelet, an electronic necklace, an electronic appcessory, electronic tattoos, or a smart watch).

According to various embodiments of the present invention, the electronic device may be a smart home appliance. For example, the smart home appliance may include at least one of a television, a Digital Video Disk (DVD) player, an audio, a refrigerator, an air conditioner, a vacuum cleaner, an oven, a microwave oven, a washing machine, an air cleaner, a set-top box, a TV box (e.g., Samsung HomeSync™, Apple TV™, or Google TV™), a game console, an electronic dictionary, an electronic key, a camcorder, and an electronic photo frame.

According to various embodiments of the present invention, the electronic device may include at least one of various medical devices (e.g., a magnetic resonance angiography (MRA), a magnetic resonance imaging (MRI), a computed tomography (CT) machine, and an ultrasonic machine), navigation devices, global positioning system (GPS) receivers, event data recorders (EDR), flight data recorders (FDR), vehicle infotainment devices, electronic devices for ships (e.g., navigation devices for ships, and gyro-compasses), avionics, security devices, automotive head units, robots for home or industry, automatic teller machines (ATMs), or point of sales (POS) devices in shops and stores.

According to various embodiments of the present invention, the electronic device may include at least one of furniture or a part of a building/structure, an electronic board, an electronic signature receiving device, a projector, and various types of measuring devices (for example, a water meter, an electric meter, a gas meter, a radio wave meter and the like) including a camera function.

An electronic device according to various embodiments of the present invention may be a combination of one or more of above described various devices. Also, an electronic device according to various embodiments of the present invention may be a flexible device. Also, an electronic device according to various embodiments of the present invention is not limited to the above described devices.

Figure 2:
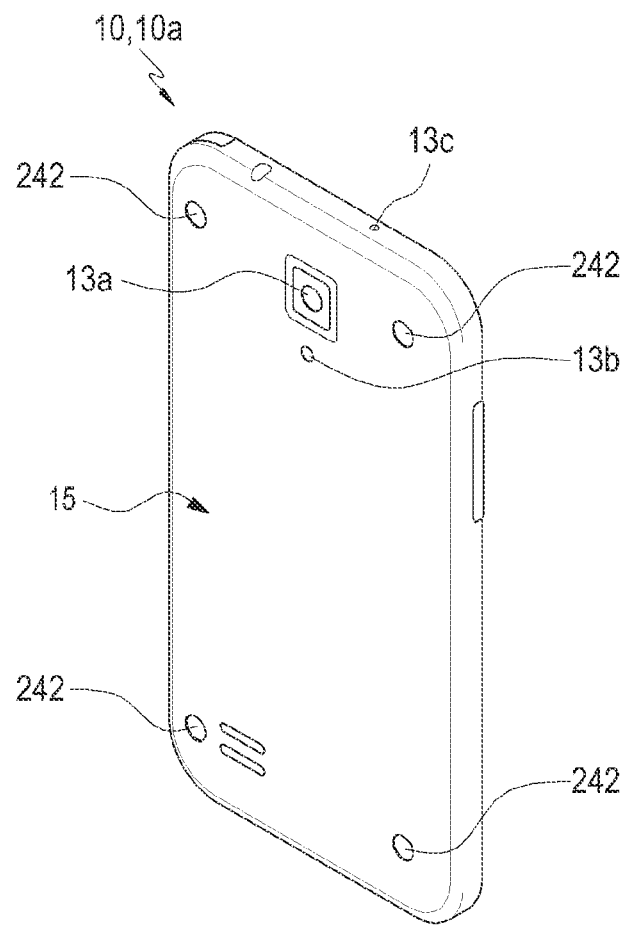
FIG. 2 is a perspective view illustrating a rear surface of the first electronic device that can be attached to and detached from the protection cover, according to an embodiment of the present invention.

FIG. 1 is a perspective view illustrating the front surface of an electronic device 10. FIG. 2 is a perspective view illustrating the rear surface of the electronic device 10. The electronic device 10 may be a smart phone or a wearable device. The configuration of the electronic device 10, such as a smart phone or a wearable device, will be described with reference to FIGS. 1 and 2.

As illustrated in FIG. 1, a touch screen 11 may be disposed in the center of the front surface of the electronic device 10. The touch screen 11 may occupy most of the front surface of the electronic device 10. FIG. 1 illustrates an example in which a main home screen is displayed on the touch screen 11. The main home screen is the first screen that is displayed on the touch screen 11 when the electronic device 10 is turned on. Further, where the electronic device 10 has several pages of different home screens, the main home screen may be the first one of the several pages of home screens. Short-cut icons for executing frequently used applications, a main menu switching key, time, weather, etc. may be displayed on the main home screen. The main menu switching key may display a menu screen on the touch screen 11. A status bar 11d for displaying statuses, such as a battery charging status, strength of a received signal, and current time, may also be formed on the upper end of the touch screen 11. A home key 11a, a menu button 11b, and a back button 11c may be formed on the lower side of the touch screen 11.

The home key 11a may be used to display the main home screen on the touch screen 11. For example, when the home key 11a is touched in a state where any home screen different from the main home screen or the menu screen is displayed, the main home screen may be displayed on the touch screen 11. Further, when the home key 11a is touched while applications are being executed on the touch screen 11, the main home screen may be displayed on the touch screen 11. Also, the home key 11a may also be used to display recently used applications or a task manager on the touch screen 11. The menu button 11b may be used to provide a connectivity menu which may be used on the touch screen 11. The connectivity menu may include a widget addition menu, a background switching menu, a search menu, an editing menu, an environment setting menu, etc. The back button 11c may be used to display the screen executed just before the currently executed screen, or may terminate the most recently used application.

According to various embodiments of the present invention, a first camera 12a, an illumination sensor 12b or a proximity sensor 12c, and a speaker 12d may be disposed on the upper end portion of the front surface of the electronic device 10.

As illustrated in FIG. 2, a second camera 13a, a flash 13b, or a speaker 13c may be disposed on the rear surface of the electronic device 10. If the electronic device 10 is configured such that a battery pack is detachable, the bottom surface of the electronic device 10 may be a detachable battery cover 15. In addition, one or more attachment/detachment members 242 are formed on the rear surface of the electronic device 10, where hook members 241 (illustrated in FIG. 4) included in a protection cover are detachably coupled to the attachment/detachment members 242.

Figure 3:
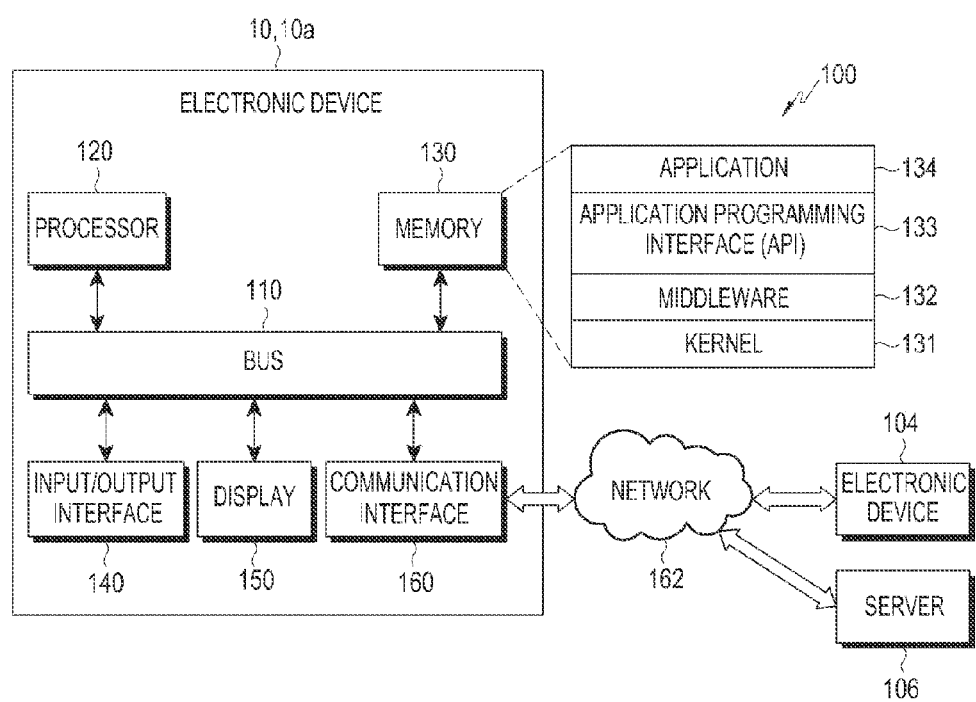
FIG. 3 is a block diagram illustrating a network environment including an electronic device, according to an embodiment of the present invention.

FIG. 3 illustrates a network environment 100 of the electronic device 10 configured as a smart phone, according to an embodiment of the present invention.

Referring to FIG. 3, the electronic device 10 may include a bus 110, a processor 120, a memory 130, an input/output interface 140, a display 150, and a communication interface 160. The bus 110 is a circuit for connecting components of the electronic device 10 and transferring communication (e.g., a control message) between the components.

The processor 120, for example, receives instructions from the other components (e.g., the memory 130, the input/output interface 140, the display unit 150, the communication interface 160, etc.) through the bus 110, decodes the received instructions, and carries out operations or data processing according to the decoded instructions.

The memory 130 stores instructions or data received from, or generated by the processor 120 or the other components (e.g., the input/output interface 140, the display unit 150, the communication interface 160, etc.). The memory 130 may include programming modules, such as, for example, a kernel 131, middleware 132, an Application Programming Interface (API) 133, applications 134 etc. Each of the programming modules may be configured with software, firmware, hardware, or a combination of two or more thereof.

The kernel 131 controls or manages system resources (e.g., the bus 110, the processor 120, the memory 130, etc.) used to execute operations or functions implemented in the other programming modules, for example, the middleware 132, the API 133, and the applications 134. Further, the kernel 131 may provide an interface through which the middleware 132, the API 133, or the applications 134 may access individual components of the electronic device 10 to control or manage the components.

The middleware 132 functions as an intermediary for making the API 133 or the applications 134 exchange data with the kernel 131 in communication with the kernel 131. Further, in regard to task requests received from the applications 134, the middleware 132 may perform a control (e.g., scheduling or load balancing) for the task requests using a method of assigning, to at least one of the applications 134, a priority to use the system resources of the electronic device 10 (e.g., the bus 110, the processor 120, the memory 130, etc.).

The API 133 is an interface through which the applications 134 control functions provided from the kernel 131 or the middleware 132, and may include, for example, at least one interface or function (e.g., instruction) for file control, window control, image processing, text control, etc.

According to various embodiments of the present invention, the applications 134 may include a short message service (SMS)/multimedia messaging service (MMS) application, an e-mail application, a calendar application, an alarm application, a health care application (e.g., an application for measuring a work rate or blood sugar level), an environment information application (e.g., an application for providing atmospheric pressure, humidity, or temperature information), etc. Alternatively, the applications 134 may include an application relating to information exchange between the electronic device 10 and an external electronic device 104. The application relating to information exchange may include, for example, a notification relay application for forwarding specific information to an external electronic device, or a device management application for managing an external electronic device.

For example, the notification relay application may include a function of transferring notification information generated from other applications of the electronic device 10 (e.g., an SMS/MMS application, an e-mail application, a health care application, an environmental information application, etc.) to the external electronic device 104. Alternatively, the notification relay application may, for example, receive notification information from the external electronic device 104 and provide the received notification information to a user. The device management application may manage (e.g., install, delete, or update), for example, a function for at least a part of the external electronic device 104 that communicates with the electronic device 10 (e.g., activating/deactivating the external electronic device 104 itself (or some components) or adjusting the brightness (or resolution) of a display), an application operated in the external electronic device 104, or a service provided from the external electronic device 104 (e.g., a telephone call service or a message service).

According to various embodiments of the present invention, the applications 134 may include an application specified based on the attribute (e.g., type) of the external electronic device 104. For example, in the cases where the external electronic device 104 is an MP3 player, the applications 134 may include an application relating to the reproduction of music. Similarly, in the cases where the external electronic device 104 is a mobile medical device, the applications 134 may include an application relating to health care. According to an embodiment of the present invention, the applications 134 may include at least one of applications specified to the electronic device 10 or applications received from a server 106 or the external electronic device 104.

The input/output interface 140 forwards an instruction or data input by a user through an input/output device (e.g., a sensor, a keyboard, or a touch screen) to the processor 120, the memory 130, and the communication interface 160 through the bus 110. For example, the input/output interface 140 may provide the processor 120 with data corresponding to a user's touch input through a touch screen. The input/output interface 140 may, for example, output instructions or data received through the bus 110 from the processor 120, the memory 130, and the communication interface 160, through an input/output device (e.g., a speaker or display). The input/output interface 140 may include an audio module.

The display unit 150 displays various types of information (e.g., multimedia data, text data, etc.) to a user.

The communication interface 160 connects communication between the electronic device 10 and the electronic device 104 or the server 106. For example, the communication interface 160 may be connected to a network 162 through wireless or wired communication to communicate with the external electronic device 104 or the server 106. The wireless communication may include, for example, at least one of Wireless Fidelity (Wi-Fi), Bluetooth (BT), Near Field Communication (NFC), a Global Positioning System (GPS), and cellular communication (e.g., Long Term Evolution (LTE), LTE Advanced (LTE-A), Code Division Multiple Access (CDMA), Wideband CDMA (WCDMA), Universal Mobile Telecommunications System (UMTS), Wireless Broadband (WiBro), Global System for Mobile Communication (GSM), etc.). The wired communication may include, for example, at least one of a Universal Serial Bus (USB), a High Definition Multimedia Interface (HDMI), Recommended Standard 232 (RS-232), and a Plain Old Telephone Service (POTS).

According to an embodiment of the present invention, the network 162 may be a telecommunication network. The telecommunication network may include at least one of a computer network, the Internet, Internet of Things, and a telephone network. According to an embodiment of the present invention, a protocol for communication between the electronic device 10 and an external device (e.g., a transport layer protocol, a data link layer protocol, or a physical layer protocol) may be supported by at least one of the applications 134, the API 133, the middle ware 132, the kernel 131, and the communication interface 160.

According to various embodiments of the present invention, a controller may include the processor 120 and the memory 130 for storing information required by the processor 120. The controller is a central processing unit that controls overall operations of the electronic device 10.

An electronic device, which will be described below, is configured as first and second electronic devices 10, 10a. The first electronic device 10 is configured as one of the aforementioned notebook computer, net-book computer, smart phone, tablet PC, a Galaxy Tab, and an iPad, and the second electronic device 10a is configured as a keyboard. In this embodiment of the present invention, the tablet PC as the first electronic device 10 will be described as an example.

Figure 4:
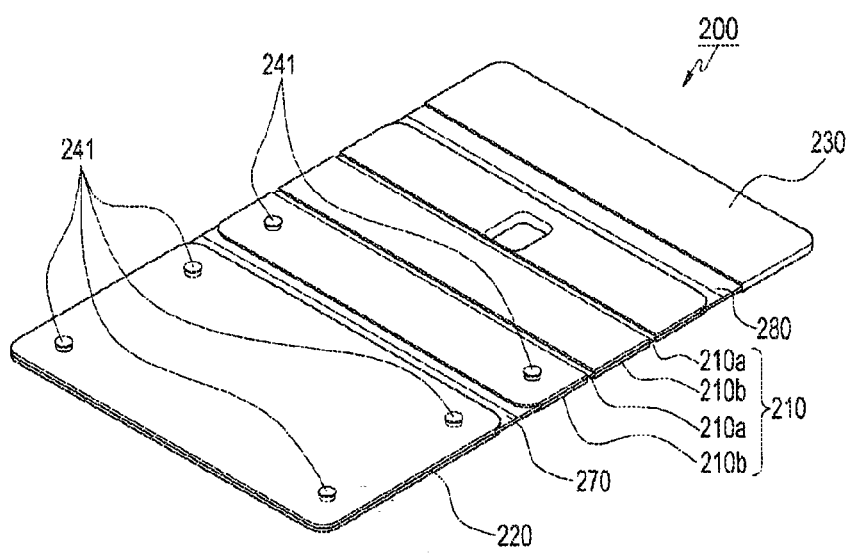
FIG. 4 is a perspective view illustrating a configuration of a protection cover according to an embodiment of the present invention.

Further, as illustrated in FIG. 4, the protection cover is a protection cover 200 for protecting the first and second electronic devices 10, 10a. The protection cover 200 illustrated in FIG. 4 is described as an example of the protection cover, but the present invention is not limited thereto. That is, any cover capable of protecting the first and second electronic devices 10, 10a may be used as the protection cover 200. In various embodiments of the present invention, the protection cover will be described as being mounted on the surfaces of the first and second electronic devices 10, 10a.

The configuration of a protection cover for protecting the first and second electronic devices 10, 10a will be described with reference to FIGS. 4 to 6. The protection cover 200 includes first to third covers 210, 220, 230 and one or more attachment/detachment units 240.

Figure 5:
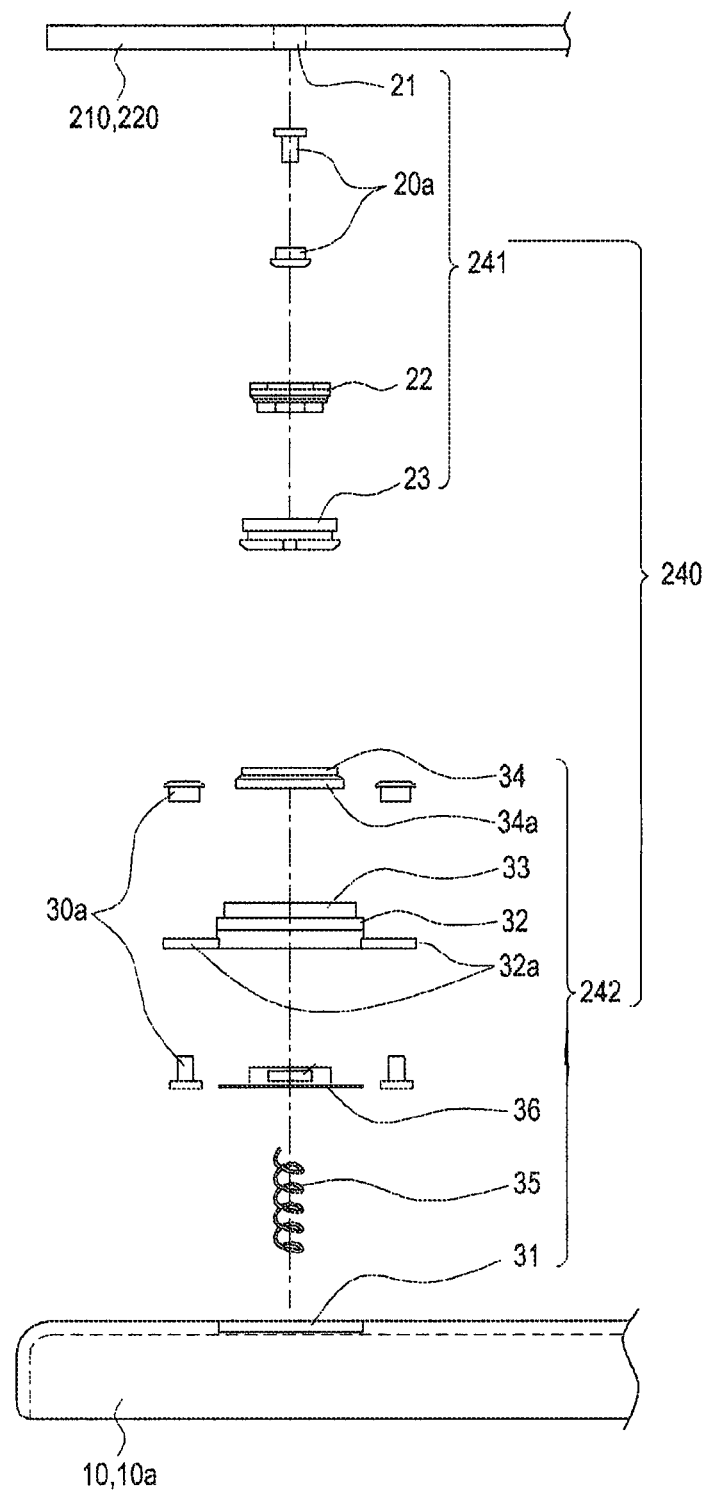
FIG. 5 is an exploded side view illustrating an attachment/detachment unit among elements of the protection cover, according to an embodiment of the present invention.
Figure 6:
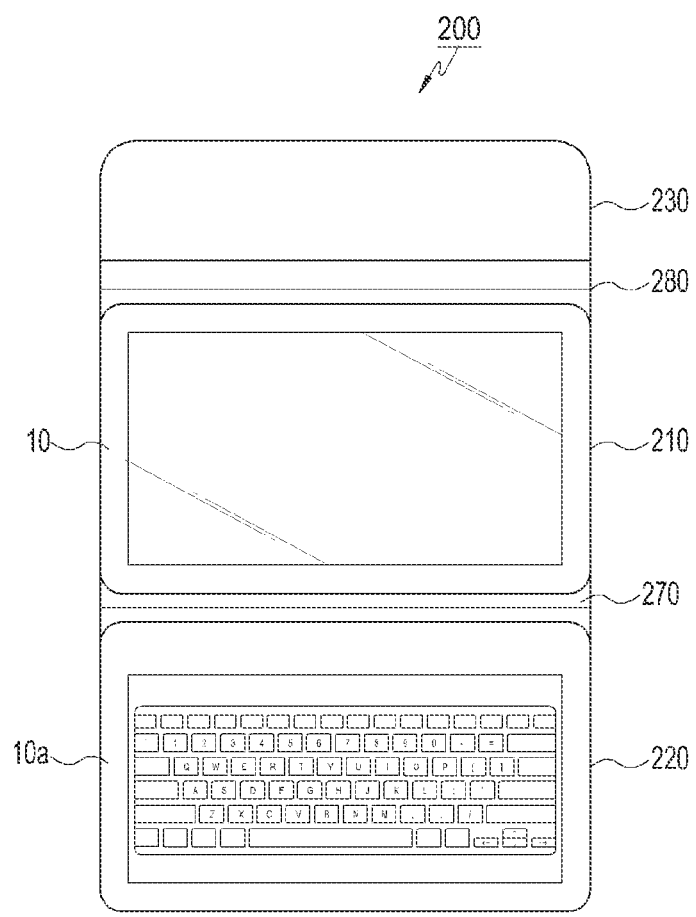
FIG. 6 is a front view illustrating a state in which first and second electronic devices are mounted on the protection cover, according to an embodiment of the present invention.

FIG. 4 is a perspective view illustrating the configuration of the protection cover 200 according to an embodiment of the present invention, FIG. 5 is an exploded side view illustrating an attachment/detachment unit 240 among the elements of the protection cover 200, according to an embodiment of the present invention, and FIG. 6 is a front view illustrating a state in which the first and second electronic devices 10, 10a are mounted on the protection cover 200, according to an embodiment of the present invention.

As illustrated in FIGS. 4 and 5, the rear surface of the first electronic device 10 can be attached to/detached from the front surface of the first cover 210, and the first cover 210 may be folded to be used as a cradle. The rear surface of the second electronic device 10a can be attached to/detached from the front surface of the second cover 220, and the second cover 220 is connected to the first cover 210 so as to be foldable. The third cover 230 is connected to the first cover 210 so as to be foldable such that the first and second covers 210, 220 may be used as a cradle through folding.

Furthermore, the attachment/detachment units 240 are mounted to the first and second covers 210, 220 for the attachment/detachment of the first and second electronic devices 10, 10a, respectively.

As described above, the first cover 210 on which the first electronic device 10 including a touch screen is mounted and the second cover 220 on which the second electronic device 10a configured with a keyboard is mounted may be used as a cradle through folding thereof, the third cover 230 may be configured to support the cradle, and the first and second electronic devices 10, 10a may be attached to/detached from the first and second covers, respectively, by the attachment/detachment units 240 provided to the first and second covers 210 and 220. Accordingly, the electronic device 10 with the touch screen and the keyboard 10a may be used and carried together using the single protection cover. In addition, various tasks can be performed through the keyboard 10a when the protection cover 200 is used as a stand cradle or a typing cradle, so that the usability of the products can be enhanced and expanded.

Figure 8:
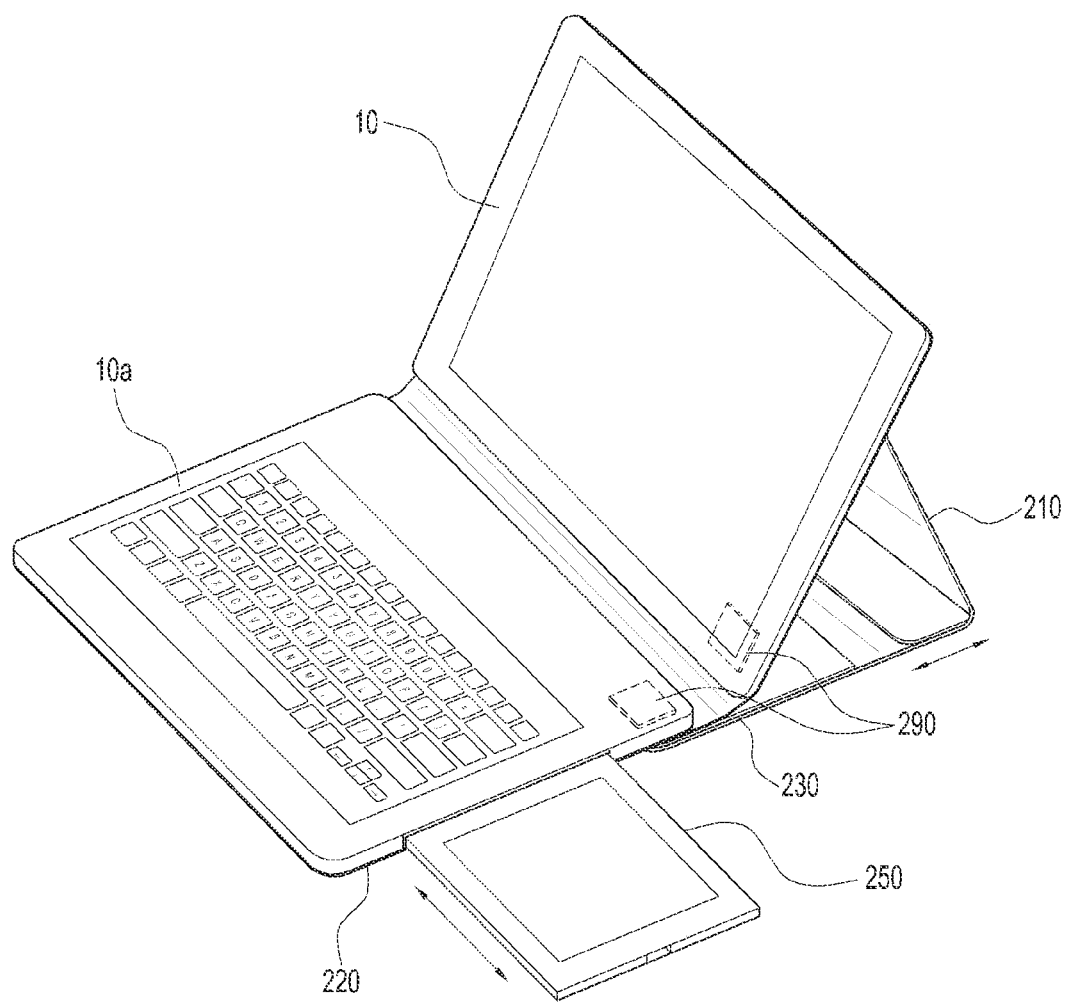
FIG. 8 is a perspective view illustrating the protection cover, which is used as a stand cradle and a typing cradle, according to an embodiment of the present invention.
Figure 9:
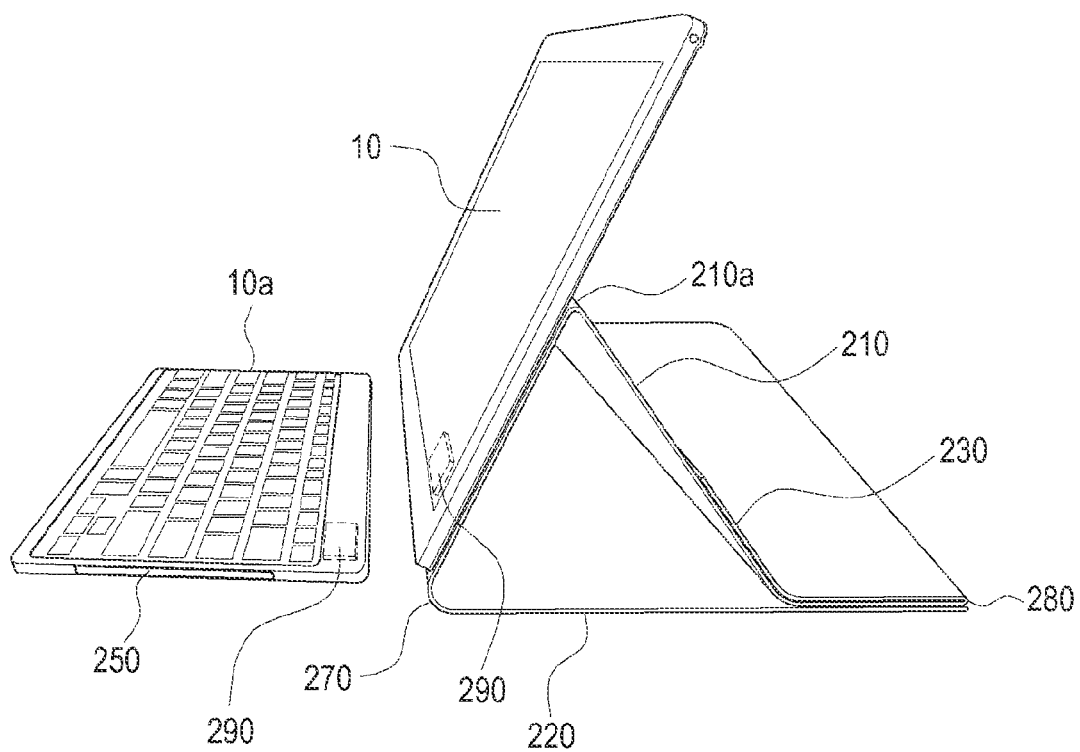
FIG. 9 is a perspective view illustrating an application example of the protection cover according to an embodiment of the present invention.

In addition, referring to FIGS. 8 and 9, a touch input unit 250 is disposed on a side of the keyboard 10a such that the touch input unit 250 can be inserted into or extracted from the keyboard 10a when the keyboard 10a is used.

Accordingly, when a user performs various tasks, such as word processing, social media networking, and games, through the keyboard 10a, and when touch inputs are required for such tasks, the user may extract the touch input unit 250 from the side of the keyboard 10a for the touch inputs. Further, when the user does not use the touch input unit 250, the user may insert the touch input unit 250 into the side of the keyboard 10a.

As illustrated in FIG. 4, at least one folding section is interposed between the first to third covers 210, 220, 230 to connect the covers to be foldable. The folding section includes a first folding section 270, a second folding section 280, and third folding sections 210a. The first folding section 270 is interposed between the first and second covers 210, 220 to make the first and second covers 210, 220 folded toward or unfolded away from each other. The second folding section 280 is interposed between the first and third covers 210, 230 to make the first and third covers 210, 230 folded toward or unfolded away from each other. The third folding sections 210a are disposed within the first cover 210 to make the first cover 210 folded or unfolded.

In other words, the first cover 210 may include the third folding sections 210a for folding or unfolding the first cover 210 and one or more support members 210b for supporting the first to third covers 210, 220, 230 such that the first to third covers 210, 220, 230 function as a cradle.

Accordingly, when the first to third covers 210, 220, 230 are used as a stand cradle or a typing cradle, the first cover 210 is rotated, by the first folding section 270, to be inclined with respect to the second cover 220, the support members 210b are bent several times by the third folding sections 210a disposed in the first cover 210 to make a triangular shape, and the third cover 230 connected to one end of the first cover 210 is folded by the second folding section 280 to face the bottom.

Figure 7:
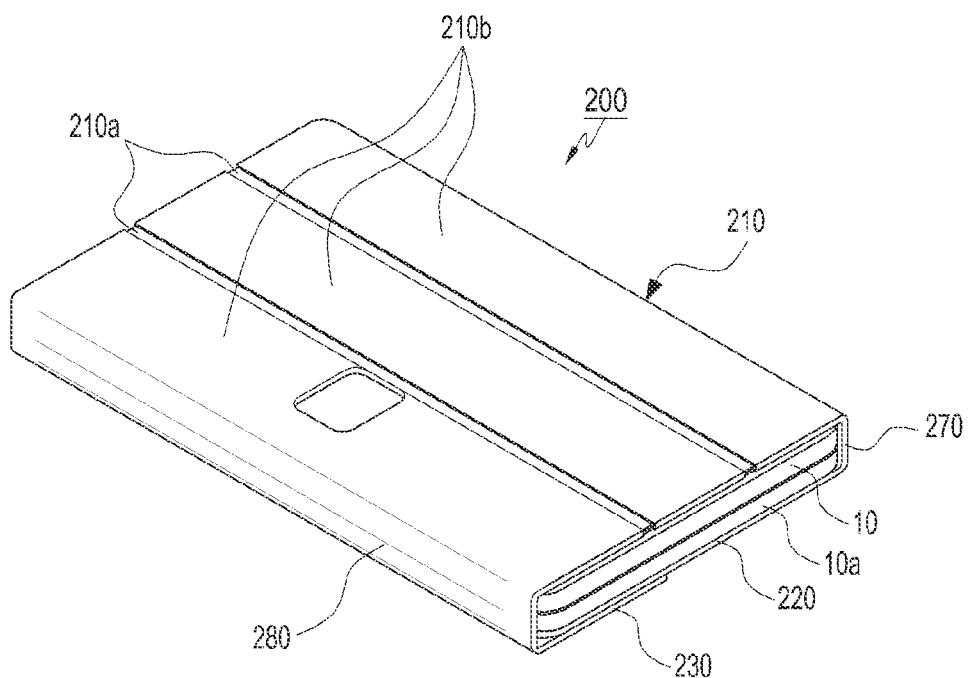
FIG. 7 is a perspective view illustrating a state in which the protection cover to which the first and second electronic devices are attached is closed, according to an embodiment of the present invention.

As illustrated in FIG. 7, when the first to third covers 210, 220, 230 are not used as a cradle, the support members 210b of the first cover 210 are unfolded by the third folding sections 210a and, in this state, the first cover 210 is made to face the rear surface of the first electronic device 10. That is, the unfolded first cover 210 is rotated by the first folding section 270, whereby the front surface of the first electronic device 10 mounted on the first cover 210 and the front surface of the keyboard 10a mounted on the second cover 220 face each other. The third cover 230 is rotated by the second folding section 280 to face the rear surface of the second cover 220.

Accordingly, the first electronic device 10 and the keyboard 10a face and overlap each other by the rotation of the first cover 210 relative to the second cover 220 through the first folding section 270, and the third cover 230 is rotated to cover the rear surface of the second cover 220. Referring to FIG. 5, the attachment/detachment unit 240 includes a hook member 241 and an attachment/detachment member 242. The hook member 241 is mounted to the first and second covers 210, 220 and is detachably coupled to the attachment/detachment member 242. The attachment/detachment member 242 is provided at a position corresponding to the hook member 241 and is mounted on the rear surface of the first and second electronic devices 10, 10a to lock or unlock the hook member 241 according to the attachment or detachment of the hook member 241.

As illustrated in FIG. 5, the hook member 241 includes a mounting part 21, a support part 22, and a stopping part 23. The mounting part 21 is formed through the first and second covers 210, 220 such that a screw 20a or other securing element passes through the mounting part 21 and is coupled to the support part 22. The mounting part 21 may be a mounting hole. The support part 22 is inserted into the stopping part 23 so as to be coupled with the stopping part 23 and the screw 20a at the same time. The stopping part 23 is coupled with the support part 22 and is secured to the first and second covers 210, 220 by the support part 22 at the same time. That is, in order to mount the hook member 241 to the first and second covers 210, 220, the screw 20a is coupled through the mounting hole, the support part 22 is coupled to the first and second covers 210, 220 using the screw, and the stopping part 23 is coupled to the support part 22, thereby the stopping part 23 is mounted to the first and second covers 210, 220. The support part 22 and the stopping part 23 may be formed of one of urethane and polycarbonate, but are not limited thereto. That is, other materials in addition to the disclosed materials may be employed. For example, the support part 22 and the stopping part 23 may also be formed of one of acrylic, polyethylene, and polyethylene terephthalate.

As illustrated in FIG. 5, the attachment/detachment member 242 includes a mounting section 31, a button module 32, an engagement fixing part 33, a button 34, a resilient member 35, and a support member 36. The mounting section 31 is formed on the rear surfaces of the first and second electronic devices 10, 10a for mounting the button module 32, the engagement fixing part 33, the button 34, the resilient member 35, and the support member 36. The button module 32 has open front and rear sides and is mounted on the mounting section 31, the button 34 is coupled to the open front side of the button module 32, and the support member 36 is coupled to the open rear side of the button module 32. The engagement fixing part 33 is disposed in the button module 32 to lock or unlock the hook member 241 according to the attachment or detachment of the hook member 241 in the button module 32. The button 34 is coupled to the open front side of the button module 32 and exposed to the outside. When the button 34 is brought into contact with and pressed by the hook member 241, the button 34 linearly moves to attach/detach the hook member 241 to/from the button module 32. The resilient member 35 is disposed in the button module 32 and provides resilient force to linearly move the button 34. The support member 36 is disposed on the lower side of the button module 32 to support the resilient member 35. That is, when the hook member 241 of the first or second cover 210 or 220 is brought into contact with the button 34 exposed through the open front side of the button module 32 and is pressed, the button 34 is also pressed together, and the hook member 241 is coupled to the inside of the button module 32 at the same time when the button 34 linearly moves in the pressed direction. At this time, the hook member 241 is stopped by and fixed to the engagement fixing part 33 of the button module 32. In the case of separating the hook member 241 from the button module 32, when the hook member 241 is pulled, the button 34 is linearly moved by the resilient member 35 to return to the original position at the same time when the hook member 241 is separated from the engagement fixing part 33 of the button module 32. A pair of screw fastening parts 32a is formed on the button module 32 such that the button module 32 is coupled to the electronic devices 10, 10a through screws 30a. The engagement fixing part 33 may be configured with a separation preventing member that is stopped by a stopper 34a formed on the button 34 to prevent the button 34 from being separated from the button module 32.

Furthermore, the attachment/detachment unit 240 may be configured with a magnetic device.

The magnetic device includes at least one first magnet part and at least one second magnet part. The first magnet part faces the second magnet part, and is mounted on the rear surfaces of the first and second electronic devices 10, 10a to be attached or detached by a magnetic force. The second magnet part may face the first magnet part and may be mounted on the first and second covers 210, 220 to attach or detach the first and second electronic devices by a magnetic force.

The first magnet part may be formed of a metal plate in the cases where the second magnet part is formed of a permanent magnet. By contrast, the second magnet part may be formed of a metal plate in the cases where the first magnet part is formed of a permanent magnet rather than a metal plate. That is, the first magnet part may be formed of a metal plate or a permanent magnet according to a selection, and the second magnet part may also be formed of a metal plate or a permanent magnet likewise to the first magnet part.

Accordingly, one of the first and second magnet parts is formed of a magnet, and the other is formed of a metal plate such that the first and second magnet parts may be attached to each other by a magnetic force.

The attachment/detachment unit 240 may be configured with an attachment/detachment hook member to attach/detach the first and second electronic devices to/from the first and second covers. The attachment/detachment hook member can be attached to and detached from the outer peripheries of the first and second electronic device 10, 10a.

The first and second covers 210, 220 may be configured as one of the keyboard 10a, a cradle, a battery cover, a protection cover, and a flip cover. The first and second covers 210, 220 may also be applied to other devices in addition to the above devices.

The attachment/detachment unit 240 may be configured with a connector such that the first and second covers 210, 220 and the first and second electronic devices 10, 10a are electrically connected to each other when attached to each other. The connector may include a first connector and a second connector. The first connector may be configured with the hook member 241 which is mounted to the first and second covers 210, 220, and the second connector may be configured with the attachment/detachment member 242 which is mounted to the first and second electronic devices 10, 10a.

Accordingly, when the attachment/detachment members 242 of the first and second electronic devices 10, 10a are brought into contact with and press-fitted with the hook members 241 of the first and second covers 210, 220, the attachment/detachment members 242 configured with the second connector are electrically connected to the hook members 241 configured with the first connector, and the first and second electronic devices 10, 10a are electrically connected to each other by the first and second connectors to transmit/receive electrical signals at the same time. For example, the first electronic device 10 may be configured with a touch screen, the second electronic device 10a may be configured with a keyboard, and a signal of the keyboard may be provided to the first electronic device 10 through the first and second connectors.

Referring to FIGS. 8 and 9, the first and second electronic devices 10, 10a may have a short-range communication module 290 embedded therein to wirelessly transmit/receive data in a short range when the first and second covers 210, 220 are attached or detached.

According to another embodiment of the present invention, the first and second covers 210, 220 may have a short-range communication module 290 embedded therein to wirelessly transmit/receive data over a short range when the first and second covers 210, 220 are attached or detached.

The short-range communication module 290 may be configured with an NFC module, but is not limited thereto. That is, any unit capable of wirelessly transmitting and receiving data in a short range may be diversely employed as the short-range communication module 290.

Hereinafter, the assembly and operations of the protection cover 200 will be described with reference to FIGS. 7 to 9. The protection cover 200 includes the first to third covers 210, 220, 230, the first folding section 270 is interposed between the first and second covers 210, 220, and the second folding section 280 is interposed between the first and third covers 210, 230.

The first electronic device 10 having a touch screen is mounted on the first cover 210. At this time, the attachment/detachment members 242 coupled to the first electronic device 10 are mounted on the hook members 241 coupled to the first cover 210. Also, the attachment/detachment members 242 coupled to the second electronic device 10a configured with a keyboard are mounted on the hook members 241 coupled to the second cover 220.

FIG. 7, as described above, is a perspective view illustrating a state in which the protection cover to which the first and second electronic devices are attached is closed, and FIG. 8 is a perspective view illustrating the protection cover, which is used as a stand cradle and a typing cradle.

The third cover 230 facing the rear surface of the second cover 220 as shown in FIG. 7 is rotated and unfolded through the second folding section 280. The second cover 220 as shown in FIG. 7 is rotated and unfolded away from the first cover 210 through the first folding section 270.

At this time, the first electronic device 10 having a touch screen, which is mounted to the first cover 210, is exposed, and the keyboard 10a mounted to the second cover 220 is also exposed together. Then, the first cover 210 is rotated and bent by the third folding sections 210a included in the first cover 210. That is, since the first cover 210 includes the one or more support members 210b, the support members 210b are rotated by the third folding sections 210a to make a triangular shape, and the third cover 230 is rotated by the second folding section 280 and placed on the bottom.

Then, as illustrated in FIG. 8, the third cover 230 is brought into surface-contact with and supported by the bottom. The rear surface of the second cover 220 makes surface-contact with the bottom, and the third cover 230 is folded by the folding section 280 and supported by the bottom. The first electronic device 10 is obliquely mounted on the first cover 210, which forms the triangular shape, where the rear surface of the first electronic device makes surface-contact with the first cover. The rear surface of the second cover 220 is brought into surface-contact with and supported by the bottom. That is, the front surface of the second cover 220 supports the keyboard 10a, and the rear surface of the second cover 220 makes surface-contact with the bottom.

At this time, as illustrated in FIG. 8, the protection cover 200 is used as a stand cradle or a typing cradle by the first to third covers 210, 220, 230.

Furthermore, a user may not only view various contents through the first electronic device 10 having a touch screen, which is mounted on the protection cover, but may also perform various tasks through the keyboard 10a.

In addition, as illustrated in FIG. 8, in the cases where the user wants to input a touch while performing various tasks through the keyboard 10a, the user may extract and use the touch input unit 250 disposed on the side of the keyboard 10a. The user may return the touch input unit 250 into the side of the keyboard 10a after use.

The present invention may be applied to the tasks described above, and may also be applied to other various tasks using the screen of the electronic device and the keyboard 10a.

In order to overcome a problem in the prior art described above, the present invention has such a configuration that the first electronic device 10 having a touch screen and the second electronic device 10a configured with the keyboard 10a are mounted together on the first and second covers 210, 220 of the protection cover 200, so that a user can perform the various tasks through the screen of the electronic device and the keyboard 10a, thereby enhancing portability and convenience of the keyboard 10a as well as further enhancing and expanding the usability of the protection cover.

Also, in another embodiment of present invention using the protection cover, as illustrated in FIG. 9, the keyboard 10a mounted on the second cover 220 is separated therefrom when the first to third covers 210, 220, 230 are used as a cradle.

The first cover 210 on which the first electronic device 10 is mounted is obliquely rotated relative to the second cover 220 by the first folding section 270, and in this state, the front surface of the second cover 220 makes surface-contact with the bottom.

The first cover 210 is bent by the third folding sections 210a included in the first cover 210, and the third cover 230 connected to one end of the first cover 210 is folded by the second folding section 280 and is supported by the rear surface of the second cover 220.

The third cover 230 is brought into surface-contact with and supported by the rear surface of the second cover 220, and the separated keyboard 10a is placed in front of the first electronic device 10 which is obliquely mounted on the protection cover.

Accordingly, the front surface of the second cover 220 is brought into surface-contact with and supported by the bottom, and the first cover 210 is supported above the rear surface of the second cover 220 and is supported to be inclined by bringing the first and third covers 210, 230 into surface-contact with each other.

Here, since the separated keyboard 10a and the first electronic device 10 have the short-range communication modules 290 embedded therein, the first electronic device 10 and the separated keyboard 10a on the front side thereof may wirelessly transmit and receive data through the short-range communication modules 290.

Thus, a data signal input to the keyboard 10a may be transmitted to the first electronic device 10 through the short-range communication modules 290.

As described above, the keyboard 10a has the attachment/detachment members 242 which can be attached to or detached from the hook members 241 disposed in the second cover 220, and therefore may be used while being separated from the hook members 241 of the second cover 220 through the attachment/detachment members 242 thereof. When the keyboard 10a is not used, the attachment/detachment members 242 of the second cover 220 can be mounted on the hook members 241 of the keyboard 10a.

According to the various embodiments of the present invention, where a user performs various tasks through an electronic device using the first to third covers, which the electronic device and a keyboard are attached to or detached from together and which are used as a stand cradle and a typing cradle through folding thereof, the user can utilize the keyboard without needing to use the touch screen of the electronic device, thereby further enhancing and expanding usability of the products and enhancing portability and convenience of the electronic device and the keyboard.

While the present invention has been shown and described with reference to certain embodiments thereof, it will be apparent to those skilled in the art that the present invention is not limited to these embodiments, and various changes in form and details may be made therein without departing from the spirit and scope of the present invention as defined by the appended claims and their equivalents.

What is claimed is:

1. A protection cover comprising:
   a first cover having a first front surface configured to mount to a rear surface of a first electronic device, the first cover being bendable;
   a second cover rotatably coupled to a first edge of the first cover, the second cover having a second front surface configured to mount to a rear surface of a second electronic device and being devoid of a folding section; and
   a third cover rotatably coupled to a second edge of the first cover, wherein when the first cover is bent:
   the second cover rotates about the first edge, a portion of the first front surface, which is smaller than the entire first front surface, supports the first electronic device, and
   the third cover rotates about the second edge so that a portion of the third cover is in overlapping contact with a portion of the second cover, forming a cradle for the first electronic device.

2. The protection cover of claim 1, wherein the first electronic device includes one of a touch screen, a net-book computer, a smart phone, and a tablet personal computer, and the second electronic device is a keyboard.

3. The protection cover of claim 1, wherein the first and second covers comprise an attachment/detachment unit through which the first and second electronic devices are attachable to or detachable from the first and second covers.

4. A protection cover comprising:
   a first cover having a first front surface configured to mount to a rear surface of a first electronic device, the first cover being bendable;
   a second cover rotatably coupled to a first edge of the first cover, the second cover having a second front surface configured to mount to a rear surface of a second electronic device and being devoid a folding section; and
   a third cover rotatably coupled to a second edge of the first cover, wherein when the first cover is bent:
   the second cover rotates about the first edge, a portion of the first front surface, which is smaller than the entire first front surface supports the first electronic device, and
   the third cover rotates about the second edge so that a portion of the third cover is in overlapping contact with a portion of the second cover, forming a cradle for the first electronic device,
   wherein the first, second, and third covers form a cradle through folding thereof, and the first and second covers each include at least one attachment/detachment unit for attaching or detaching the first and second electronic devices.

5. The protection cover of claim 4, wherein the first electronic device is one of a touch screen, a net-book computer, a smart phone, and a tablet personal computer, and the second electronic device is a keyboard.

6. The protection cover of claim 5, wherein the keyboard comprises a touch input unit on a side thereof, and the touch input unit can be introduced into/extracted from the keyboard.

7. The protection cover of claim 4, wherein at least one folding section is interposed between the first, second, and third covers to connect the first, second, and third covers to be foldable.

8. The protection cover of claim 7, wherein the at least one folding section comprises:
   a first folding section that is interposed between the first and second covers to fold the first and second covers;
   a second folding section that is interposed between the first and third covers to fold the first and third covers; and
   at least one third folding section that is disposed in the first cover to fold the first cover.

9. The protection cover of claim 8, wherein the first cover comprises at least one support member that is foldable by the at least one third folding section and supports the first, second, and third covers such that the first, second, and third covers form the cradle.

10. The protection cover of claim 4, wherein the at least one attachment/detachment unit comprises:
   at least one hook member mounted to the first and second covers; and
   at least one attachment/detachment member that is mounted on rear surfaces of the first and second electronic devices and is provided at positions corresponding to the at least one hook member to lock or unlock the at least one hook member according to attachment or detachment of the at least one hook member.

11. The protection cover of claim 10, wherein the at least one attachment/detachment unit is configured with a magnetic device,
   wherein the magnetic device comprises:
   at least one first magnet part mounted on the rear surfaces of the first and second electronic devices; and
   at least one second magnet part that is mounted on the first and second covers, faces the at least one first magnet part, and can attach or detach the first and second electronic devices by a magnetic force.

12. The protection cover of claim 10, wherein the at least one attachment/detachment unit is configured with an attachment/detachment hook member that attaches/detaches the first and second electronic devices to/from the first and second covers.

13. The protection cover of claim 4, wherein the first and second covers form one of a cradle, a battery cover, a protection cover, and a flip cover.

14. The protection cover of claim 4, wherein the at least one attachment/detachment unit is configured with a connector such that the first and second covers and the first and second electronic devices are electrically connected to each other when the first and second electronic devices are respectively attached to the first and second covers.

15. The protection cover of claim 14, wherein the connector comprises a first connector and a second connector,
   wherein the first connector is configured with a hook member mounted to the first and second covers, and the second connector is configured with an attachment/detachment member mounted to the first and second electronic devices.

16. The protection cover of claim 4, wherein the first and second electronic devices have a short-range communication module embedded therein to wirelessly transmit/receive data over a short range when attached to or detached from the first and second covers.

17. The protection cover of claim 16, wherein the short-range communication module is configured with a Near Field Communication (NFC) module.

* * * * *